United States Patent
Hieb et al.

(10) Patent No.: US 10,122,439 B2
(45) Date of Patent: Nov. 6, 2018

(54) PRE-ALLOCATING NETWORK RESOURCES FOR COMMUNICATIONS BETWEEN A NETWORK HUB AND A REMOTE TERMINAL

(71) Applicant: Verizon Patent and Licensing Inc., Arlington, VA (US)

(72) Inventors: Richard D. Hieb, Corinth, TX (US); Joseph F. Thomasson, Allen, TX (US); Danny M. Fleeman, McKinney, TX (US); Gary A. Neirynck, Parker, TX (US); Jerry R. Creekbaum, Duluth, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 150 days.

(21) Appl. No.: 15/149,609

(22) Filed: May 9, 2016

(65) Prior Publication Data
US 2017/0324464 A1    Nov. 9, 2017

(51) Int. Cl.
*H04B 7/185*    (2006.01)
*H04W 72/04*    (2009.01)
*H04B 7/0456*    (2017.01)

(52) U.S. Cl.
CPC ...... *H04B 7/18513* (2013.01); *H04W 72/042* (2013.01); *H04W 72/0413* (2013.01)

(58) Field of Classification Search
CPC ............ H04W 72/042; H04W 72/0413; H04B 7/18513; H04B 7/0456
See application file for complete search history.

(56) References Cited

U.S. PATENT DOCUMENTS

| | | | | |
|---|---|---|---|---|
| 5,442,634 A | * | 8/1995 | Cizek | H04W 84/08 370/329 |
| 5,778,320 A | * | 7/1998 | Drozt | H04W 72/044 455/450 |
| 6,223,041 B1 | * | 4/2001 | Egner | H04W 16/04 455/450 |

(Continued)

OTHER PUBLICATIONS

Verizon, "Commonwealth of Massachusetts: Internet Protocol—Private IP Satellite," http://www.verizonenterprise.com/solutions/public_sector/state_local/contracts/cwma/wireline/service_catalog/internet_protocol/private_ip_satellite.xml, May 1, 2015, 2 pages.

(Continued)

*Primary Examiner* — Rasheed Gidado (57) ABSTRACT

A first device may pre-allocate network resources for multiple communications between a first device and a second device. The second device may be associated with one or more third devices. The network resources may be pre-allocated prior to the second device receiving a request for a communication, of the multiple communications, for transmission from a third device of the one or more third devices. The first device may receive an indication to allocate the network resources for the communication. The first device may allocate a portion of the network resources for the communication. The first device may cause the communication to be transmitted between the first device and the second device and between the second device and the third device. The first device may deallocate the portion of the network resources after causing the communication to be transmitted.

20 Claims, 7 Drawing Sheets

(56) References Cited

U.S. PATENT DOCUMENTS

| | | | | |
|---|---|---|---|---|
| 7,340,759 B1* | 3/2008 | Rodriguez | ......... | H04N 21/2385 |
| | | | | 348/E5.002 |
| 7,839,883 B2* | 11/2010 | Dan | ...................... | G06F 9/5027 |
| | | | | 370/229 |
| 7,929,441 B1* | 4/2011 | Ganesamoorthi | ..... | H04L 47/805 |
| | | | | 370/235 |
| 7,984,153 B2* | 7/2011 | Krishnaswamy | ....... | H04L 41/14 |
| | | | | 709/223 |
| 9,060,015 B2* | 6/2015 | Lawn | ...................... | H04L 65/80 |
| 9,615,376 B2* | 4/2017 | Kato | ...................... | H04W 72/10 |
| 2001/0029519 A1* | 10/2001 | Hallinan | ............... | G06F 9/5016 |
| | | | | 718/104 |
| 2006/0020694 A1* | 1/2006 | Nag | .................. | H04L 29/06027 |
| | | | | 709/223 |
| 2008/0144525 A1* | 6/2008 | Crockett | ............. | H04W 72/005 |
| | | | | 370/254 |
| 2010/0061334 A1* | 3/2010 | Gault | .................... | H04L 5/0005 |
| | | | | 370/330 |
| 2010/0067432 A1* | 3/2010 | Baptista | ............. | H04B 7/18582 |
| | | | | 370/316 |
| 2011/0161778 A1* | 6/2011 | Kim | .................. | H03M 13/6306 |
| | | | | 714/758 |
| 2013/0138807 A1* | 5/2013 | Perkuhn | ................ | H04W 28/26 |
| | | | | 709/224 |

OTHER PUBLICATIONS

Wikipedia, "Voice over IP," https://en.wikipedia.org/wiki/Voice_over_IP, Apr. 11, 2016, 18 pages.

* cited by examiner

PRE-ALLOCATING NETWORK RESOURCES FOR COMMUNICATIONS BETWEEN A NETWORK HUB AND A REMOTE TERMINAL

BACKGROUND

Voice over Internet protocol (VoIP) may include one or more technologies for the delivery of voice communications and/or multimedia sessions via Internet protocol (IP) networks, such as the Internet. VoIP may include transmitting the voice communications and/or the multimedia sessions as IP packets via a packet switched network. In some cases, VoIP communications may include the use of a codec (e.g., G.711 or G.729) that adjusts the transmission of the voice communications and/or the multimedia sessions.

DETAILED DESCRIPTION OF PREFERRED EMBODIMENTS

The following detailed description of example implementations refers to the accompanying drawings. The same reference numbers in different drawings may identify the same or similar elements.

In a network, such as a very-small-aperture terminal (VSAT) network or a time division multiple access (TDMA) network, a network hub may allocate bandwidth for communications to and/or from a remote terminal. In some cases, the network hub may allocate the bandwidth based on a priority of the remote terminal. For example, the network hub may over-allocate the bandwidth, based on a quality of service (QoS) level associated with the remote terminal, to reduce latency, jitter, and/or packet loss associated with the communications. In some cases, such as in a business continuity context, the network hub may have difficulty allocating bandwidth between active and idle remote terminals, because the remote terminals may be assigned the same or a similar QoS level.

Implementations described herein enable a network hub device to determine an amount of bandwidth to provide for communications to and/or from a remote terminal. In addition, the network hub device may pre-allocate the bandwidth to the active remote terminal prior to the remote terminal needing the bandwidth for the communications (e.g., pre-allocate the bandwidth). This improves network communications by increasing an efficiency of the communications via pre-allocation of the bandwidth to active remote terminals. In addition, implementations described herein enable the network hub device to allocate portions of different network resources for different communications. This improves network communications by reducing latency, jitter, and/or packet loss associated with the communications via use of different network resources for the different communications.

Figure 1A:
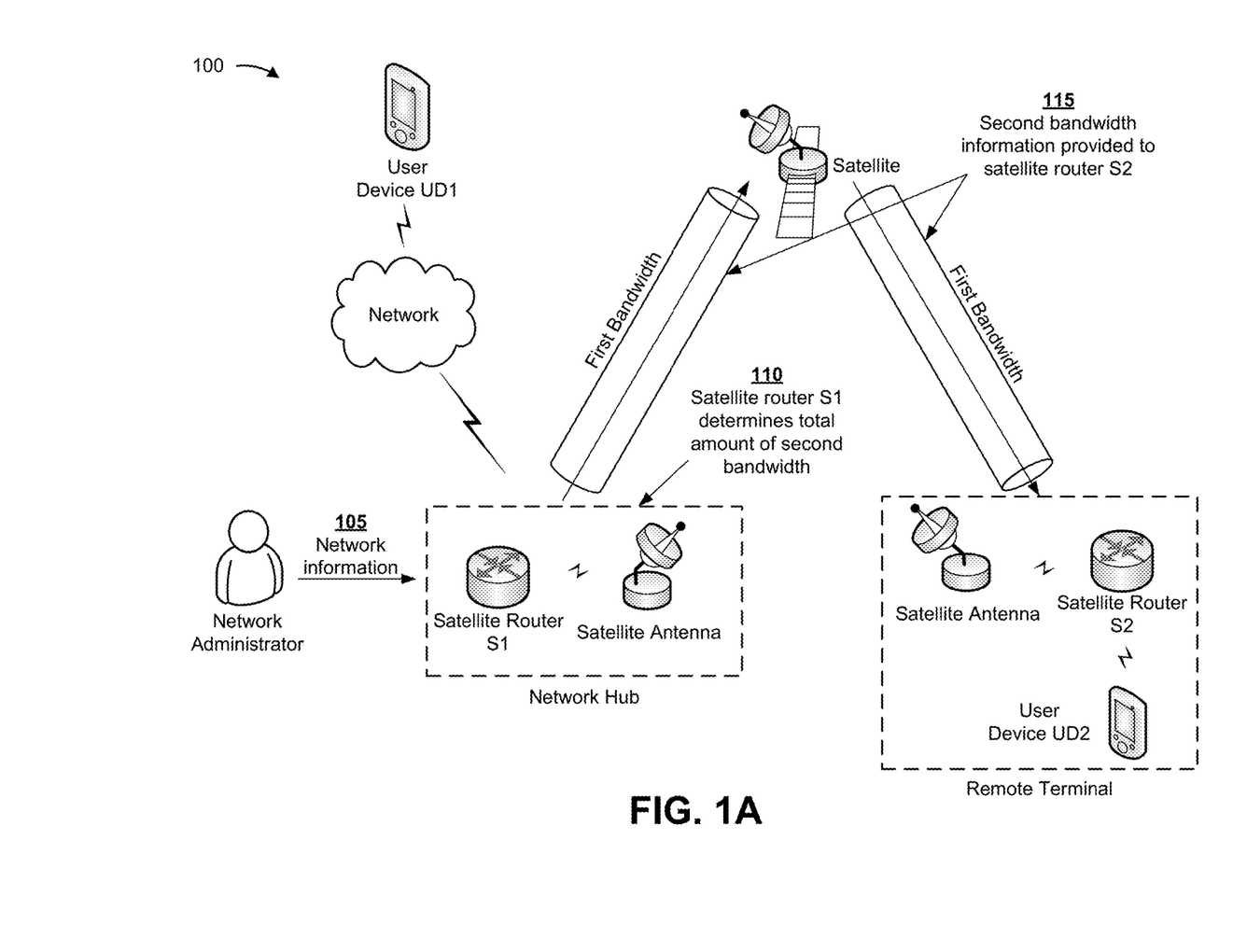
FIGS. 1A-1D are diagrams of an overview of an example implementation described herein.

FIGS. 1A-1D are diagrams of an overview of an example implementation 100 described herein. As shown in FIG. 1A, a network, such as a VSAT network, may include first bandwidth between a network hub and a remote terminal. For example, satellite router S1 and satellite router S2 may use the first bandwidth to exchange data. As shown by reference number 105, a network administrator may provide network information to satellite router S1 for determining an amount of second bandwidth to provide for voice over Internet protocol (VoIP) communications between the network hub and the remote terminal. For example, the network information may include a quantity of VoIP communications expected to be transmitted via the second bandwidth and an amount of second bandwidth expected to be used per VoIP communications. In some cases, satellite router S1 and satellite router S2 may use the second bandwidth to exchange VoIP communications separate from other communications and/or data exchanges, thereby improving the VoIP communications, as described below.

As shown by reference number 110, satellite router S1 may determine a total amount of second bandwidth to provide for the VoIP communications. For example, satellite router S1 may determine the total amount of second bandwidth based on the expected quantity of VoIP communications between the network hub and the remote terminal and the amount of bandwidth each VoIP communication is expected to use. As shown by reference number 115, satellite router S1 may provide second bandwidth information to satellite router S2. For example, satellite router S1 may provide information indicating an amount of second bandwidth that satellite router S2 is to request per VoIP communication.

Figure 1B:
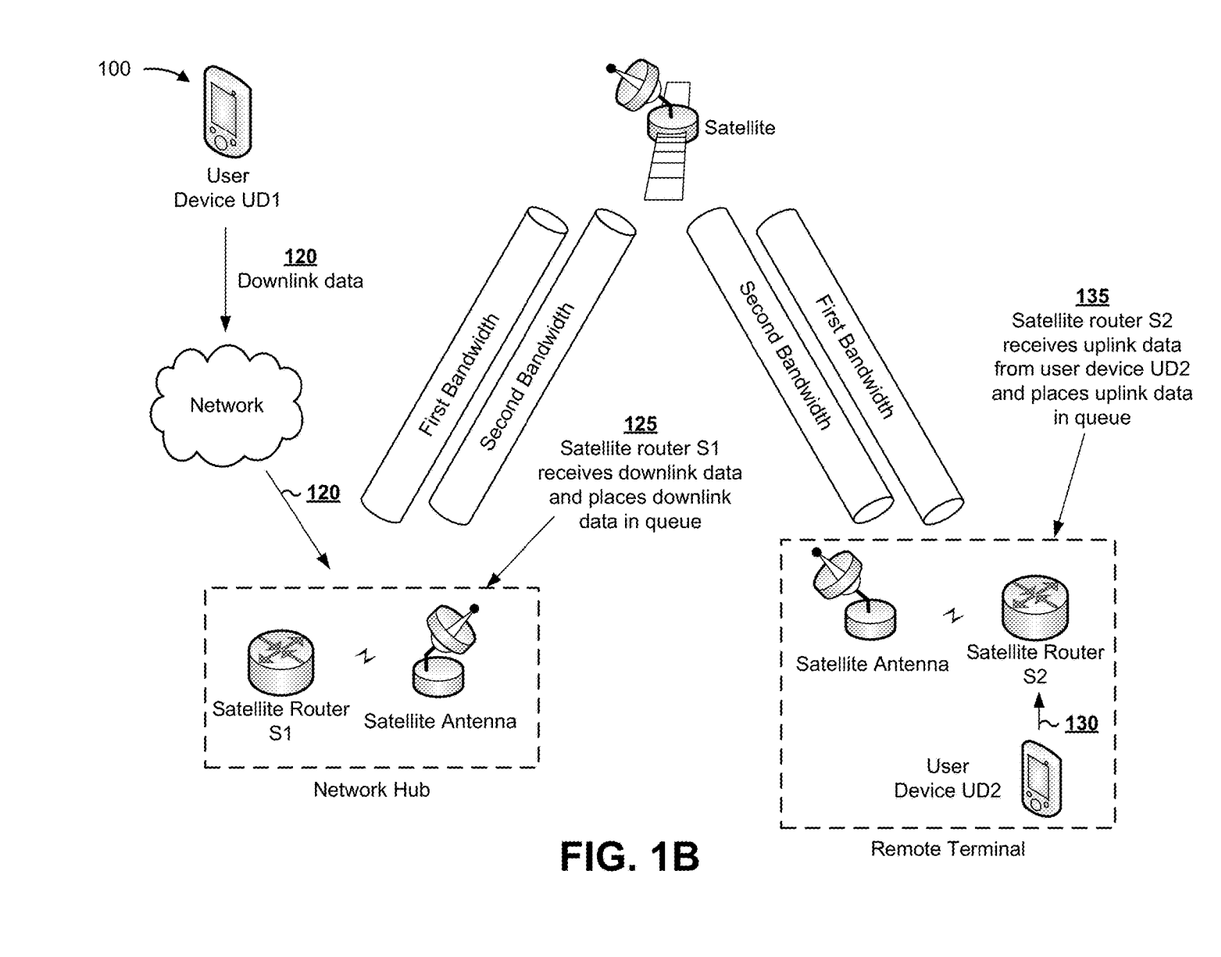

As shown in FIG. 1B, and by reference number 120, user device UD1 may provide downlink data (e.g., data destined for the remote terminal) to the network hub. As shown by reference number 125, satellite router S1 may receive the downlink data and place the downlink data in a queue for transfer to the remote terminal. As shown by reference number 130, user device UD2 may provide uplink data (e.g., data destined for user device UD1) to satellite router S2 for transmission to user device UD1. As shown by reference number 135, satellite router S2 may receive the uplink data from user device UD2 and place the uplink data in a queue for transfer to satellite router S1.

Figure 1C:
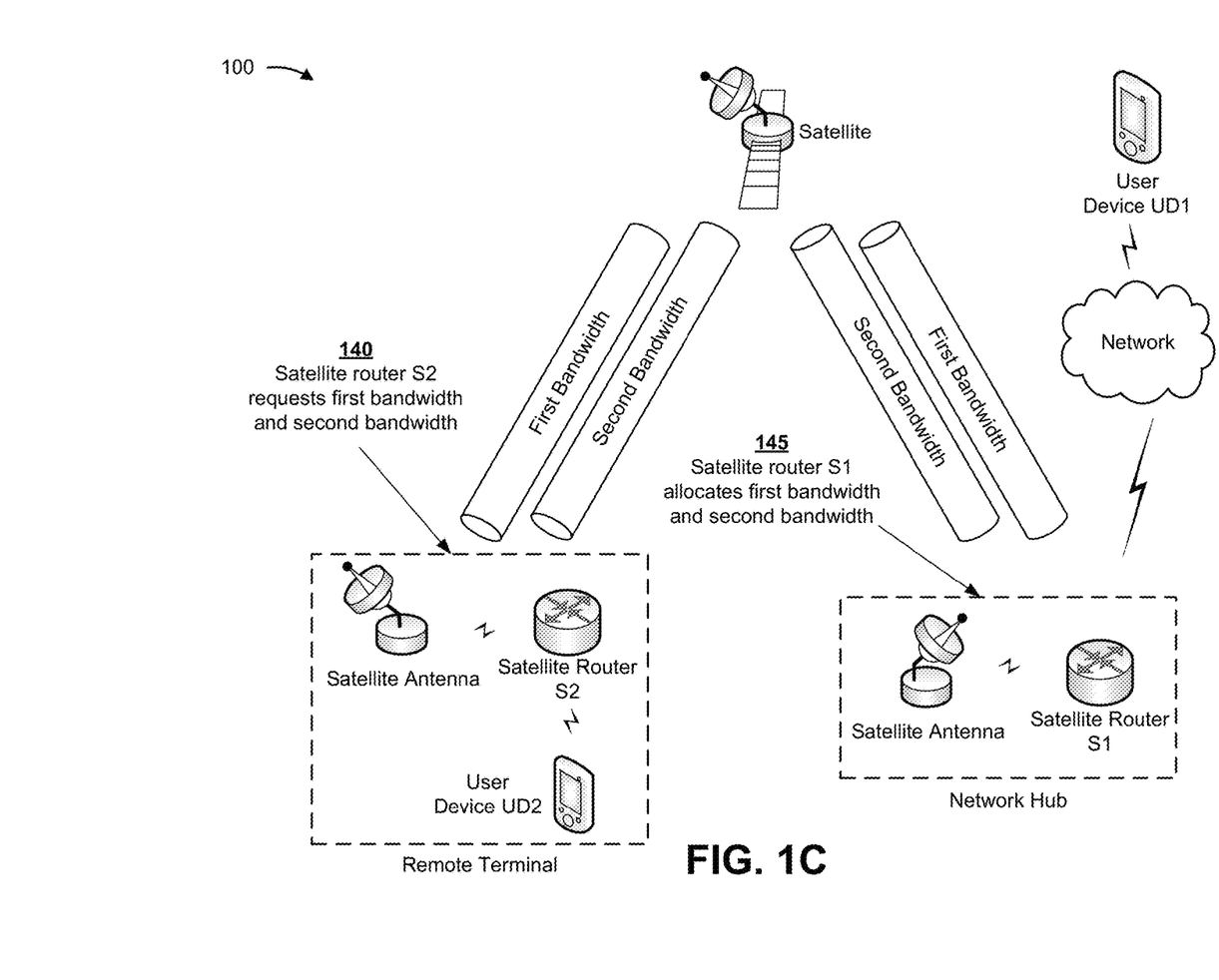

As shown in FIG. 1C, and by reference number 140, satellite router S2 may request first bandwidth and second bandwidth from satellite router S1. For example, the remote terminal may request the first bandwidth for transfer of the uplink data placed in the queue of satellite router S2. As another example, satellite router S2 may request the second bandwidth for VoIP communications (e.g., communications different from the uplink data and the downlink data). Satellite router S2 may request the second bandwidth prior to needing the second bandwidth. For example, satellite router S2 may request the second bandwidth prior to having VoIP communications to provide to the network hub, which improves a performance of the VoIP communications, as described below.

As shown by reference number 145, satellite router S1 may allocate the first bandwidth and the second bandwidth. For example, satellite router S1 may allocate a first portion of the first bandwidth for the uplink data based on receiving the request from satellite router S2 and may allocate a second portion of the first bandwidth for the downlink data based on receiving the downlink data from user device UD1. As another example, satellite router S2 may allocate a portion of the second bandwidth for VoIP communications based on the request from satellite router S2.

Figure 1D:
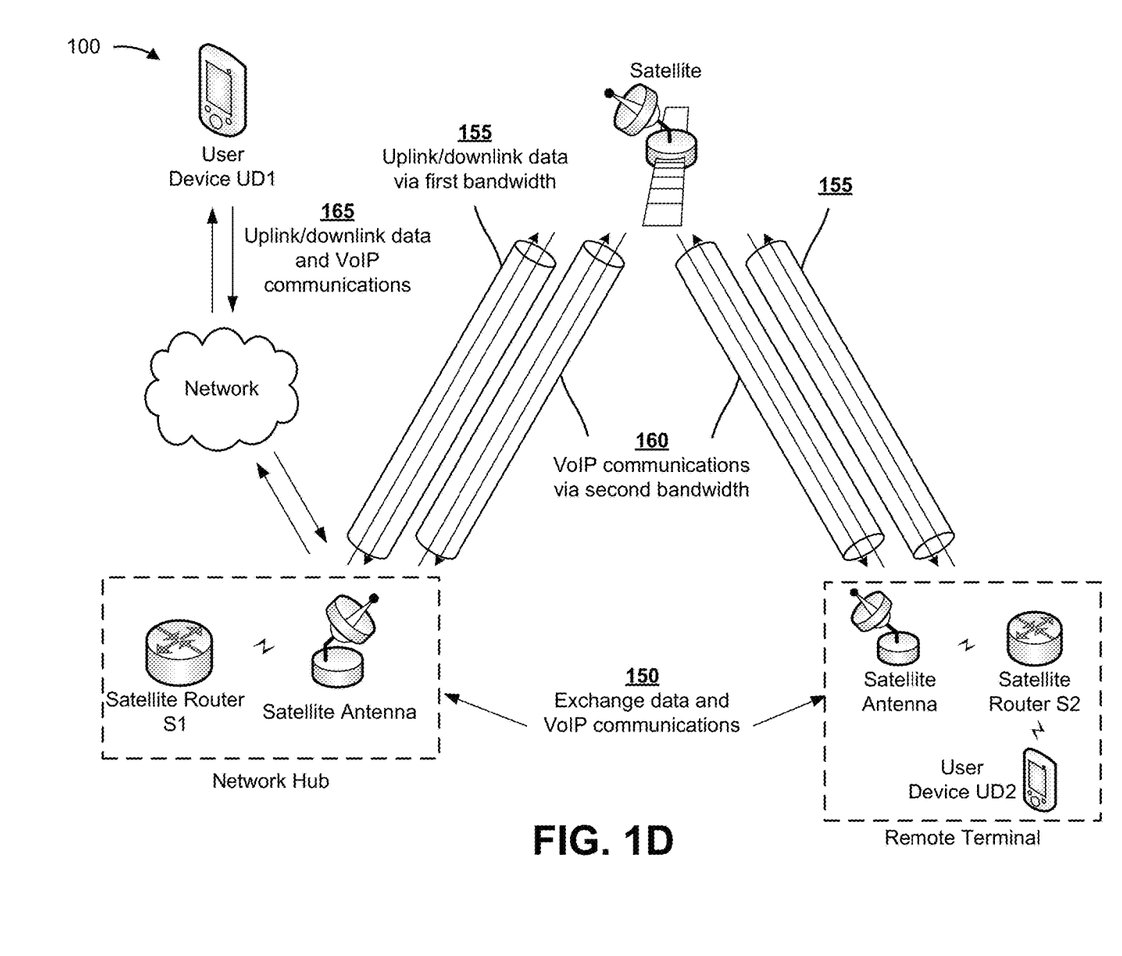

As shown in FIG. 1D, and by reference number 150, the network hub and the remote terminal may exchange data and VoIP communications. For example, satellite router S1 may receive uplink data and VoIP communications from satellite router S2. As another example, satellite router S1 may provide downlink data and VoIP communications to satellite router S2. As shown by reference number 155, satellite routers S1 and S2 may exchange the uplink data and the downlink data via the first bandwidth. As shown by reference number 160, satellite routers S1 and S2 may exchange the VoIP communications via the second bandwidth, which improves the VoIP communications, as described below.

As shown by reference number 165, satellite router S1 may exchange the uplink data, the downlink data, and the VoIP communications with user device UD1. For example, satellite router S1 may provide the uplink data received from satellite router S2 to user device UD1. As another example, satellite router S1 may provide the downlink data received from user device UD1 to satellite router S2, which may provide the downlink data to user device UD2. As another example, satellite router S1 may exchange the VoIP communications between user device UD1 and satellite router S2.

In this way, a first satellite router may determine an amount of bandwidth to provide for VoIP communications between a network hub and a remote terminal. In addition, the first satellite router may pre-allocate the bandwidth to the remote terminal prior to the remote terminal needing the bandwidth. This increases an efficiency of requesting the bandwidth for the VoIP communications by reducing or eliminating the need for a second satellite router to wait for allocation of resources for the bandwidth prior to transmitting the VoIP communications to the first satellite router. In addition, this improves the VoIP communications performance by allocating bandwidth for the VoIP communications, which reduces latency, jitter, and/or packet loss associated with the VoIP communications.

As indicated above, FIGS. 1A-1D are provided merely as an example. Other examples are possible and may differ from what was described with regard to FIGS. 1A-1D. For example, the communications between a network hub and a remote terminal may include communications other than VoIP communications, such as file transfers (e.g., streaming audio, streaming video, video conferencing, or the like), and may be exchanged via a network other than a VSAT network.

Figure 2:
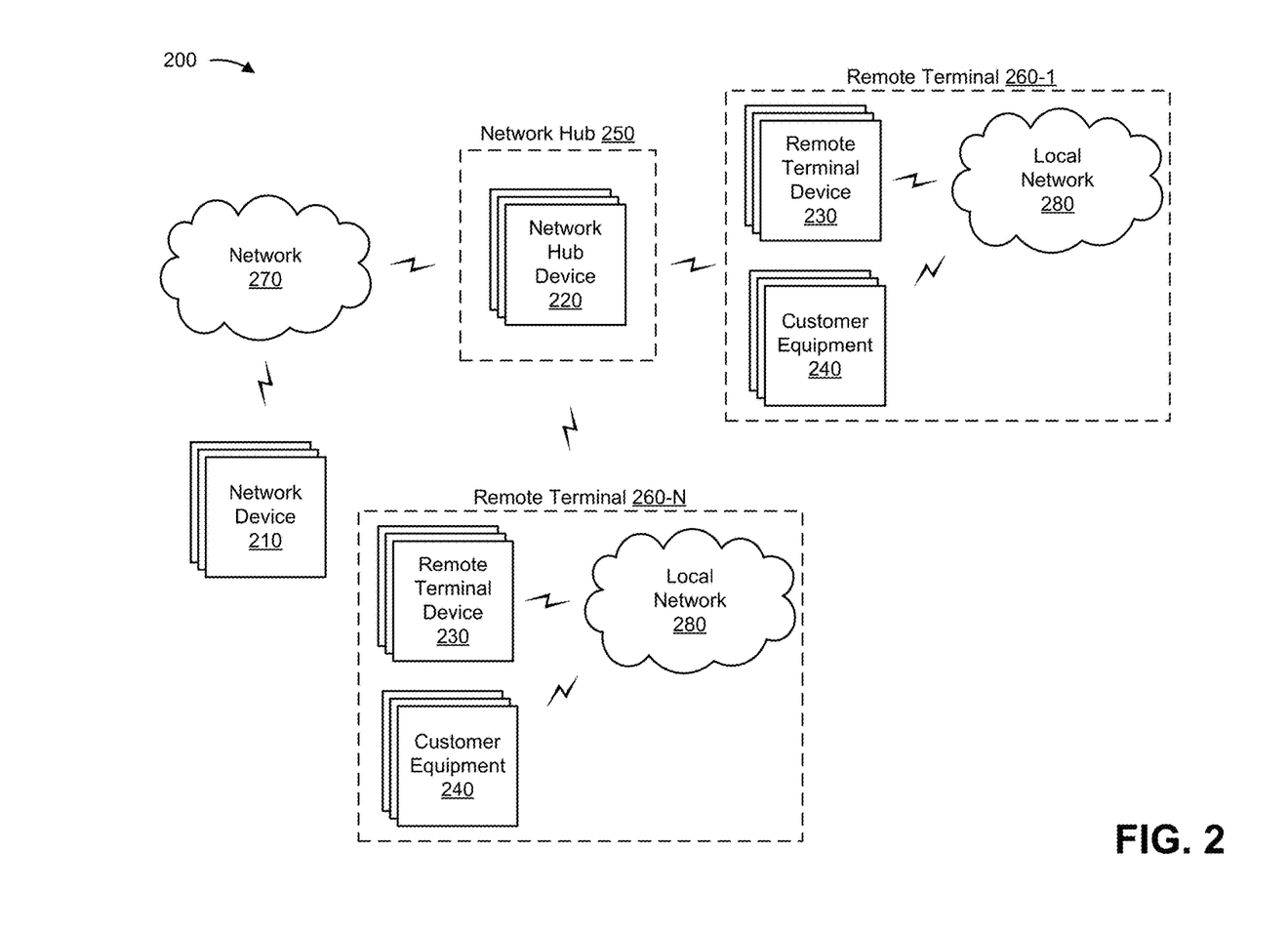
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network devices 210, one or more network hub devices 220, one or more remote terminal devices 230, one or more customer equipment 240, a network hub 250, one or more remote terminals 260-1 through 260-N (N≥1) (hereinafter referred to collectively as "remote terminals 260," and individually as "remote terminal 260"), a network 270, and a local network 280. Devices of environment 200 may interconnect via wired connections, wireless connections, or a combination of wired and wireless connections.

Network device 210 includes one or more devices capable of receiving and/or providing communications. For example, network device 210 may include a communication and/or computing device, such as a mobile phone (e.g., a smart phone or a radiotelephone), a laptop computer, a tablet computer, a personal gaming device, a wearable communication device (e.g., a smart wristwatch or a pair of smart eyeglasses), or a similar type of device. As another example, network device 210 may include a traffic transfer device, such as a router, a gateway, a switch, a hub, a bridge, a reverse proxy, a server (e.g., a proxy server), a security device, an intrusion detection device, a firewall, a load balancer, or a similar device. In some implementations, network device 210 may provide communications to and/or receive communications from remote terminal 260 (e.g., via network hub 250), as described in more detail elsewhere herein.

Network hub device 220 includes one or more devices capable of receiving and/or providing communications. For example, network hub device 220 may include a hub, a router (e.g., a satellite router), a modem (e.g., a satellite modem), an antenna, a transceiver, or a similar type of device. In some implementations, network hub device 220 may receive communications from network device 210 and provide the communications to remote terminal 260, as described in more detail elsewhere herein. Additionally, or alternatively, network hub device 220 may receive communications from remote terminal 260 and may provide the communications to network device 210, as described in more detail elsewhere herein.

Remote terminal device 230 includes one or more devices capable of receiving and/or providing communications. For example, remote terminal device 230 may include a hub, a router (e.g., a satellite router), a modem (e.g., a satellite modem), an antenna, a transceiver, or a similar type of device. In some implementations, remote terminal device 230 may receive communications from customer equipment 240 and may provide the communications to network hub 250, as described in more detail elsewhere herein. Additionally, or alternatively, remote terminal device 230 may receive communications from network hub 250 and may provide the communications to customer equipment 240 (e.g., via local network 280), as described in more detail elsewhere herein.

Customer equipment 240 includes one or more devices capable of receiving and/or providing communications. For example, customer equipment 240 may include a laptop computer, a telephone (e.g., an Internet protocol (IP) telephone), video conferencing equipment (e.g., a webcam or a display screen), a fax machine, a digital video recorder (DVR), a server, or a similar type of device. In some implementations, customer equipment 240 may receive communications from network device 210 (e.g., via remote terminal device 230 and network hub 250), as described in more detail elsewhere herein. Additionally, or alternatively, customer equipment 240 may provide communications to network device 210 (e.g., via remote terminal device 230 and network hub 250), as described in more detail elsewhere herein.

Network hub 250 includes one or more network hub devices 220. In some implementations, network hub 250 may provide communications to network device 210 and/or remote terminal 260, as described in more detail elsewhere herein. Additionally, or alternatively, network hub 250 may receive communications from remote terminal 260 and/or network device 210, as described in more detail elsewhere herein.

Remote terminal 260 includes one or more remote terminal devices 230, customer equipment 240, and/or local network 280. In some implementations, remote terminal 260 may receive communications from network hub 250 and/or provide communications to network hub 250, as described Network 270 includes one or more wired and/or wireless networks. For example, network 270 may include a cellular network (e.g., a long-term evolution (LTE) network, a 3G network, and/or a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Local network 280 includes one or more wired and/or wireless networks. For example, local network 280 may include a LAN and/or a WAN (e.g., a Wi-Fi network), a private network, an ad hoc network, an intranet, the Internet, a fiber optic-based network, a cloud computing network, or the like, and/or a combination of these or other types of networks. In some implementations, remote terminal device 230 and customer equipment 240 may communicate via local network 280.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
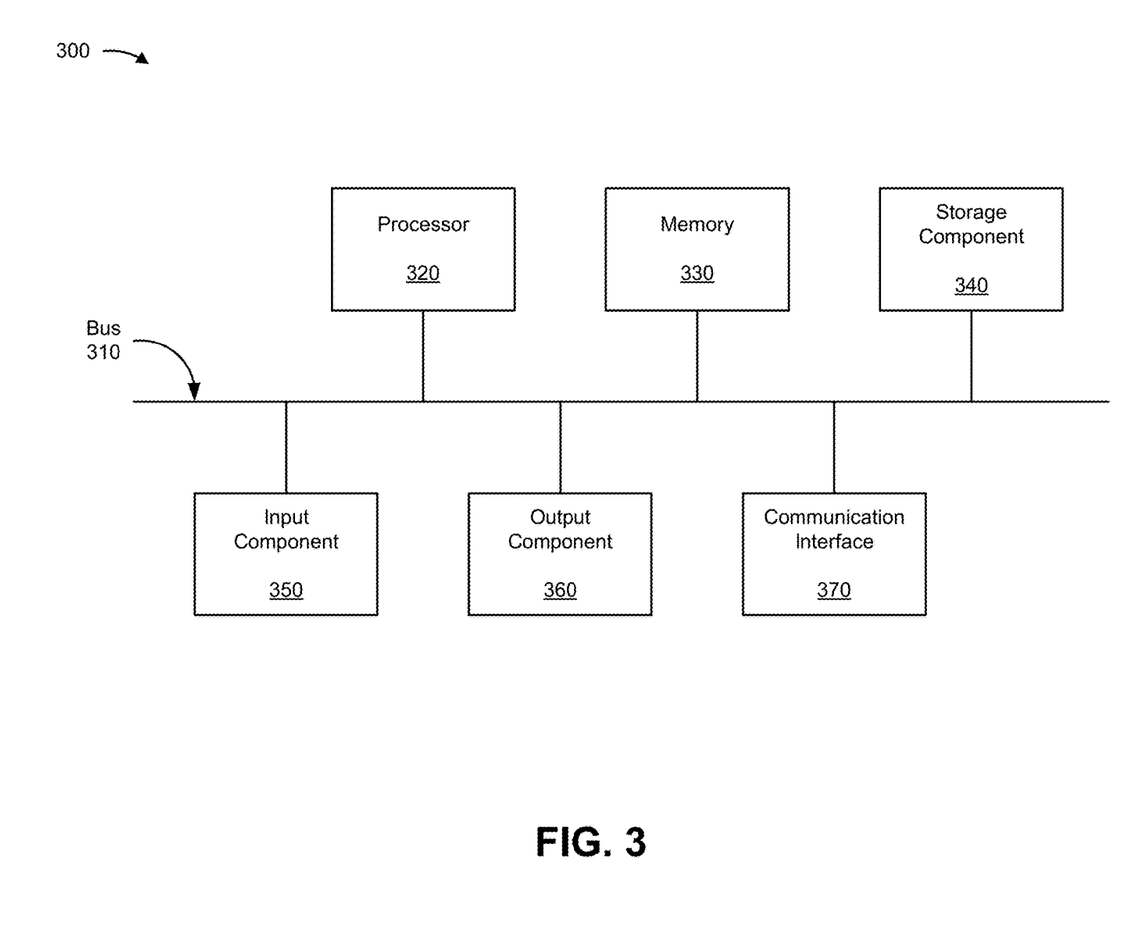
FIG. 3 is a diagram of example components of one or more devices of FIG. 2.

FIG. 3 is a diagram of example components of a device 300. Device 300 may correspond to network device 210, network hub device 220, remote terminal device 230, and/or customer equipment 240. In some implementations, network device 210, network hub device 220, remote terminal device 230, and/or customer equipment 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
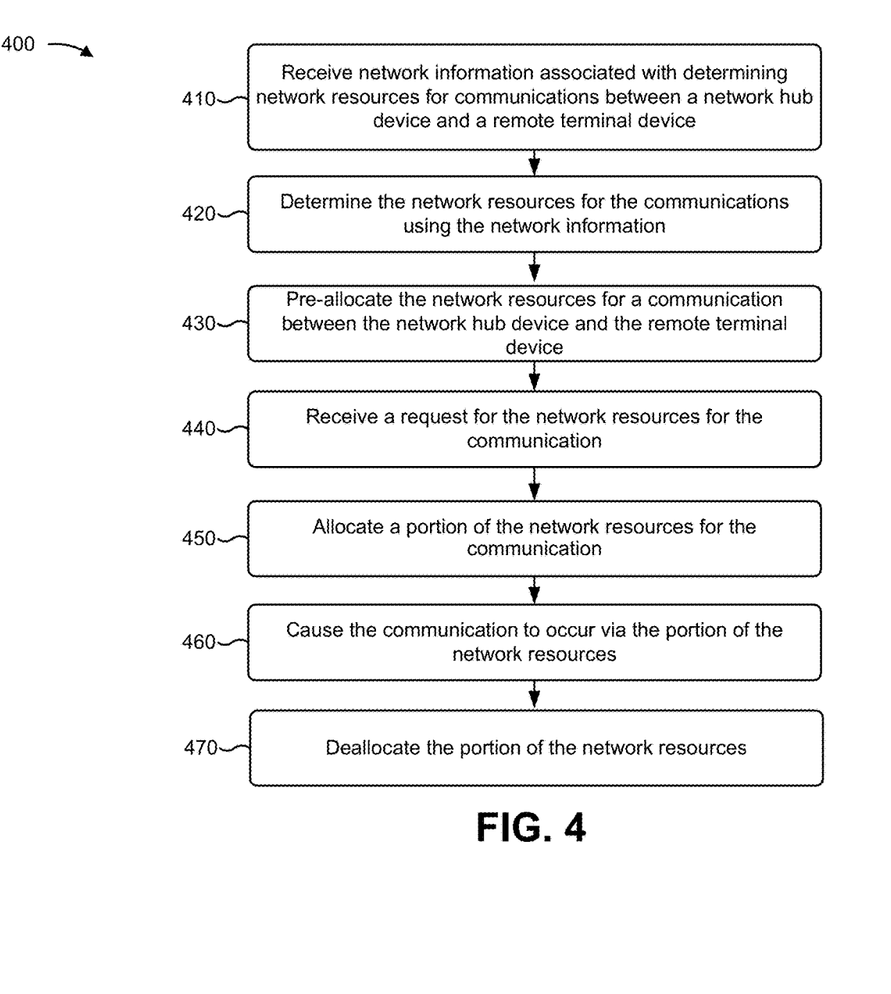
FIG. 4 is a flow chart of an example process for pre-allocating network resources for communications between a network hub and a remote terminal.

FIG. 4 is a flow chart of an example process 400 for pre-allocating network resources for communications between a network hub and a remote terminal. In some implementations, one or more process blocks of FIG. 4 may be performed by network hub device 220. In some implementations, one or more process blocks of FIG. 4 may be performed by another device or a group of devices separate from or including network hub device 220, such as network devices 210, remote terminal device 230, customer equipment 240, network hub 250, and remote terminal 260.

As shown in FIG. 4, process 400 may include receiving network information associated with determining network resources for communications between a network hub device and a remote terminal device (block 410). For example, the network information may be associated with determining an amount of bandwidth, channels, or timeslots for the communications. In some implementations, network hub device 220 (e.g., a satellite router or a satellite modem) may receive the network information from remote terminal 260 or a network administrator.

In some implementations, the network information may include information associated with determining an amount of network resources to provide for communications between network hub 250 and remote terminal 260 (e.g., VoIP communications or data transfers). For example, the network information may include information that indicates a quantity of expected VoIP communications between network hub 250 and remote terminal 260, an indication of whether the communications are to be compressed (e.g., use compressed real-time transport protocol (cRTP)), a type of codec used for the communications (e.g., G.711 or G.729), or a payload size of the communications.

As further shown in FIG. 4, process 400 may include determining the network resources for the communications using the network information (block 420). For example, network hub device 220 may determine an amount of bandwidth, channels, or timeslots to provide for VoIP communications between network hub 250 and remote terminal 260. In some implementations, network hub device 220 may determine the amount of network resources using the network information received from remote terminal 260 or the network administrator.

In some implementations, when determining the network resources, network hub device 220 may determine a quantity of expected communications between network hub 250 and remote terminal 260 based on the network information. For example, network hub device 220 may determine the quantity of expected communications based on a quantity of remote terminal devices 230 and/or customer equipment 240 associated with remote terminal 260, a default quantity of communications indicated by the network information, and/or a QoS level associated with remote terminal 260.

In some implementations, network hub device 220 may determine the quantity of expected communications based on historical information associated with communications between network hub 250 and remote terminal 260. For example, network hub device 220 may determine the quantity of expected communications based on a similar day, a similar time of day, a similar quantity of remote terminal devices 230 and/or customer equipment 240 associated with other remote terminals 260, a similar type of remote terminal devices 230 and/or customer equipment 240 (e.g., satellite routers, satellite modems, or Internet protocol (IP) telephones) associated with other remote terminals 260, past quantities of communications between network hub 250 and remote terminal 260, or types of communications (e.g., data transfers or VoIP communications) between network hub 250 and remote terminal 260. In some implementations, network hub device 220 may use the quantity of expected communications to determine the amount of network resources to provide, as described below.

In some implementations, when determining the network resources, network hub device 220 may determine an amount of network resources each communication is expected to use (e.g., a scale factor) based on the network information. For example, the network information may indicate an amount of data the communications are expected to use (e.g., an expected quantity of data), a quantity of packets per time period exchanged for the communications, a codec used for the communications, a payload size of the communications, and/or an indication of whether the communications are to be compressed. In some implementations, network hub device 220 may use the determined amount of network resources for each communication to determine a total amount of network resources to provide for the communication.

In some implementations, network hub device 220 may determine a total amount of network resources to provide for the communications. For example, network hub device 220 may determine a total amount of bandwidth, a total quantity of timeslots, and/or a total quantity of channels to provide. In some implementations, network hub device 220 may determine the total amount of network resources to provide based on determining the quantity of expected communications and the amount of network resources each communication is expected to use.

For example, assume that network hub device 220 determines that 45 VoIP communications are expected between network hub 250 and remote terminal 260 in a time period. Further assume, for example, that each VoIP communication uses four timeslots and that each timeslot is 5.568 kilobits per second (kbps) of bandwidth. In this case, network hub device 220 may determine to provide 180 timeslots or 1,002.24 kbps of bandwidth as the network resources (e.g., by multiplying 45 expected VoIP communications by four timeslots per VoIP communication by 5.568 kbps per timeslot).

In some implementations, network hub device 220 may determine an amount of network resources to provide in an uplink direction (e.g., an uplink portion or uplink network resources). For example, network hub device 220 may determine a total amount of bandwidth, timeslots, or channels to provide for communications from remote terminal 260 to network hub 250. In some implementations, network hub device 220 may determine an amount of network resources to provide in a downlink direction (e.g., a downlink portion or downlink network resources). For example, network hub device 220 may determine a total amount of bandwidth, timeslots, or channels to provide for communications from network hub 250 to remote terminal 260.

In some implementations, network hub device 220 may determine the uplink portion and the downlink portion together. For example, network hub device 220 may determine to provide the same amount of network resources for the uplink portion and the downlink portion. In some implementations, network hub device 220 may determine the uplink portion and the downlink portion independently. For example, network hub device 220 may determine the amount of network resources to provide for the uplink portion independent from determining the amount of network resources to provide for the downlink portion.

In some implementations, network hub device 220 may determine the network resources as additional network resources. For example, network hub device 220 may be exchanging communications with remote terminal device 230 using first network resources. In this case, network hub device 220 may use the network information to determine second network resources, separate from the first network resources, for exchanging a portion of the communications, thereby improving the communications by providing additional network resources, as described elsewhere herein.

In some implementations, network hub device 220 may determine the network resources prior to receiving a request to establish communications. For example, network hub device 220 may determine the network resources prior to receiving a request from network device 210 and/or remote terminal device 230 to establish communications between network hub device 220 and remote terminal device 230. This increases an efficiency of establishing communications between network hub device 220 and remote terminal device 230 by reducing or eliminating the need for network device 210 and/or remote terminal device 230 to wait for network hub device 220 to determine the network resources prior to establishing communications.

In some implementations, network hub device 220 may provide information associated with the amount of network resources to remote terminal 260 (e.g., network resources information). For example, network hub device 220 may provide information indicating an amount of network resources per communication available to remote terminal device 230, which enables remote terminal device 230 to pre-request network resources for a communication, as described below.

In this way, network hub device 220 may determine an amount of network resources to provide for communications between network hub 250 and remote terminal 260.

As further shown in FIG. 4, process 400 may include pre-allocating the network resources for a communication between the network hub device and the remote terminal device (block 430). For example, network hub device 220 may pre-allocate bandwidth, timeslots, or channels for a particular communication. In some implementation, network hub device 220 may pre-allocate the network resources based on receiving a request from remote terminal device 230.

In some implementations, network hub device 220 may receive the request to pre-allocate the network resources from remote terminal device 230 associated with an idle remote terminal 260. For example, the request may be associated with remote terminal device 230 and/or customer equipment 240 transmitting maintenance data or background data (rather than transmitting VoIP communications or other data), which may indicate that remote terminal 260 is idle. In some implementations, network hub device 220 may receive a request from remote terminal device 230 associated with an active remote terminal 260. For example, the request may be associated with remote terminal device 230 and/or customer equipment 240 transmitting VoIP communications or data other than maintenance data or background data, which may indicate that remote terminal 260 is active. In some implementations, network hub device 220 may pre-allocate the network resources based on whether remote terminal 260 is idle or active, as described below.

In some implementations, remote terminal device 230 may request that network hub device 220 pre-allocate a predetermined amount of network resources. For example, remote terminal device 230 may request a predetermined amount of bandwidth per uplink communication using the network resources information received from network hub device 220. This conserves computing resources of remote terminal device 230 by reducing or eliminating the need for remote terminal device 230 to determine the amount of network resources to request.

In some implementations, the request to pre-allocate the network resources may include a request for network resources for transmitting the communication in an uplink direction (e.g., an uplink communication). In some implementations, remote terminal device 230 may request pre-allocation of the network resources for the uplink communication prior to having the uplink communication to provide via the network resources. For example, remote terminal device 230 may receive a first uplink communication from customer equipment 240 and may request network resources for the first uplink communication and may request pre-allocation of network resources for a second uplink communication, despite not having received the second uplink communication from customer equipment 240.

This increases an efficiency of providing the first uplink communication and the second uplink communication by enabling remote terminal device 230 to request pre-allocation of network resources for the second uplink communication, thereby reducing or eliminating the need for remote terminal device 230 to wait to receive the second communication prior to requesting the network resources for the second communication.

In some implementations, network hub device 220 may receive a request to pre-allocate network resources for a communication in a downlink direction from network device 210 to remote terminal device 230 (e.g., a downlink communication). For example, network device 210 may request pre-allocation of the network resources in a manner similar to that described above with respect to an uplink communication.

In this way, network hub 250 may receive a request to pre-allocate network resources for a communication.

In some implementations, network hub device 220 may pre-allocate a portion of the network resources for the communication. For example, network hub device 220 may pre-allocate a first portion of the network resources for the uplink communication and a second portion of the network resources for the downlink communication.

In some implementations, network hub device 220 may pre-allocate the portion of the network resources based on the request for the network resources. For example, network hub device 220 may pre-allocate the amount of network resources requested by remote terminal device 230 (e.g., based on the expected data size of the communication). In some implementations, network hub device 220 may pre-allocate the network resources based on the amount of network resources the communication is expected to use. For example, assuming that network hub device 220 has previously determined that each communication is expected to use four timeslots and that each timeslot is 5.568 kbps of bandwidth, network hub device 220 may allocate four timeslots or 22.272 kbps of bandwidth for the communication.

In some implementations, network hub device 220 may pre-allocate a portion of first network resources and a portion of second network resources for multiple communications. For example, network hub device 220 may pre-allocate a portion of the first network resources for a first communication and a portion of the second network resources for a second communication. This reduces or eliminates the need for the first communication and the second communication to share network resources, thereby improving a transmission of the first communication and the second communication by reducing latency, jitter, and/or packet loss associated with the first communication and the second communication.

In some implementations, network hub device 220 may determine whether to pre-allocate the portion of the network resources based on an attribute (e.g., location, active/idle, or QoS level) of remote terminal 260 and/or the request to pre-allocate. For example, network hub device 220 may pre-allocate the portion of the network resources to remote terminals 260 that are active and may not pre-allocate the portion of the network resources to remote terminals 260 that are idle, thereby conserving bandwidth resources of network hub device 220 by pre-allocating bandwidth resources for active remote terminal devices 230 and not for idle remote terminal devices 230. In addition, this enables network hub device 220 to prioritize active remote terminals 260 over idle remote terminals 260 for network resources, including in contexts where prioritizing requests may be difficult, such as in a business continuity context.

In this way, network hub device 220 may pre-allocate network resources for a communication, including prior to remote terminal device 230 having the communication to transmit. This improves the transmission performance of the communication by reducing or eliminating the need for remote terminal device 230 to wait for allocation of the network resources prior to transmitting the communication, as described below.

As further shown in FIG. 4, process 400 may include receiving a request for the network resources for the communication (block 440). For example, network hub device 220 may receive a request for bandwidth, timeslots, or channels for immediate usage. In some implementations, network hub device 220 may receive the request from remote terminal device 230 in association with remote terminal device 230 being ready to transmit the communication to network hub device 220.

In some implementations, network hub device 220 may receive a request for the network resources for an uplink communication. For example, network hub device 220 may receive the request for the network resources for the uplink communication from remote terminal device 230. In some implementations, network hub device 220 may receive the request from remote terminal device 230 in association with remote terminal device 230 receiving the uplink communication from customer equipment 240. For example, remote terminal device 230 may request the network resources for the uplink communication when remote terminal device 230 receives the uplink communication from customer equipment 240. In some implementations, remote terminal device 230 may place the uplink communication in a queue with other uplink communications for transmission from remote terminal device 230 to network hub device 220.

In some implementations, remote terminal device 230 may request the network resources for the uplink communication based on the uplink communication. For example, remote terminal device 230 may request an amount of bandwidth based on a data size of the uplink communication and/or the other uplink communications placed in the queue. As another example, remote terminal device 230 may request an amount of bandwidth that enables remote terminal device 230 to provide the uplink communication and/or the other uplink communications placed in the queue within a threshold amount of time (e.g., within 250 milliseconds or 300 seconds).

In some implementations, network hub device 220 may receive a request for the network resources for the downlink communication. For example, network hub device 220 may receive the request for the network resources for the downlink communication from network device 210. In some implementations, network hub device 220 may receive the downlink communication from network device 210 without receiving a request for the network resources. In this case, network hub device 220 may treat receipt of the downlink communication from network device 210 as a request for the network resources. In some implementations, network hub device 220 may place the downlink communication in a queue with other downlink communications destined for remote terminal 260.

In some implementations, network hub device 220 may receive a request for first network resources and a request for second network resources. For example, assume that network hub device 220 has provided first network resources for a first type of communication, such as a data transfer, and has provided second network resources for a second type of communications, such as VoIP communications. In this case, network hub device 220 may receive a first request for the first network resources for the first type of communication and a second request for the second network resources for the second type of communication from remote terminal device 230 and/or network device 210.

In some implementations, network hub device 220 may receive a request for an amount of network resources different than the amount of network resources pre-allocated. For example, network hub device 220 may receive a request for more network resources than the amount of network resources pre-allocated or a request for fewer network resources than the amount of network resources pre-allocated. In some implementations, when network hub device 220 receives a request for an amount of network resources different than the amount of network resources pre-allocated, network hub device 220 may adjust the amount of network resources pre-allocated, as described below.

In this way, network hub device 220 may receive a request for immediate usage of network resources.

As further shown in FIG. 4, process 400 may include allocating a portion of the network resources for the communication (block 450). For example, network hub device 220 may allocate bandwidth, timeslots, or channels for immediate usage for the communication. In some implementations, network hub device 220 may allocate the portion of the network resources for the communication based on the request for the network resources.

In some implementations, network hub device 220 may allocate the amount of network resources pre-allocated for the communication. For example, network hub device 220 may have pre-allocated a first portion of the network resources for a communication between network hub device 220 and remote terminal device 230. In this case, network hub device 220 may allocate the portion of the network resources for the communication between network hub device 220 and remote terminal device 230.

In some implementations, network hub device 220 may allocate an amount of network resources different from the amount of network resources pre-allocated. For example, network hub device 220 may receive a request for more network resources than the amount of network resources pre-allocated, in which case network hub device 220 may allocate network resources in addition to the pre-allocated network resources. As another example, network hub device 220 may receive a request for fewer network resources than the amount of network resources pre-allocated, in which case network hub device 220 may allocate the requested amount of network resources and return additional pre-allocated network resources to a total pool of network resources.

In this way, network hub device 220 may allocate network resources for the communication.

As further shown in FIG. 4, process 400 may include causing the communication to occur via the portion of the network resources (block 460). For example, network hub device 220 may receive the uplink communication from remote terminal device 230 via the uplink portion of the network resources and may provide the uplink communication to network device 210. As another example, network hub device 220 may receive the downlink portion of the communication from network device 210 and may provide the downlink portion of the communication to remote terminal device 230 via the downlink portion of the network resources. As another example, network hub device 220 may provide the downlink communication from the queue to remote terminal device 230 via the network resources. In some implementations, remote terminal device 230 may provide the downlink communication to customer equipment 240 in association with receiving the downlink communication from network hub device 220.

As further shown in FIG. 4, process 400 may include deallocating the portion of the network resources (block 470). For example, network hub device 220 may return the portion of the network resources to a pool of total network resources. In some implementations, network hub device 220 may deallocate the portion of the network resources in association with completing the exchange of the communication. In some implementations, when network hub device 220 deallocates the network resources, network hub device 220 and/or remote terminal device 230 may return to an idle state or power off, thereby conserving power resources of network hub device 220 and/or network resources.

In this way, network hub device 220 may enable the portion of the network resources to be available for other communications.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein enable a network hub device to determine an amount of network resources to provide for communications between a network hub and a remote terminal and to allocate the network resources prior to the remote terminal having a need for the network resources. This increases an efficiency of the communications by reducing or eliminating the need for the remote terminal to wait for the allocation of the network resources when the remote terminal is ready to use the network resources. In addition, implementations described herein enable a network hub device to allocate portions of different network resources for different communications. This improves network communications by reducing or eliminating the need for the different communications to share network resources, thereby reducing latency, jitter, and/or packet loss associated with the different communications.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
determine historical information associated with previous communications between the device and another device;
determine an expected quantity of network resources for a communication between the device and another device based on the historical information;
pre-allocate, based on the historical information, a first set of network resources in accordance to the expected quantity of network resources for the communication prior to a customer equipment, of a plurality of customer equipment, initiating the communication,
the other device being associated with the plurality of customer equipment;
receive a request for network resources for the communication,
the request indicating a quantity of network resources different from a quantity of network resources in the pre-allocation of the first set of network resources;
adjust the pre-allocation of the first set of network resources to an allocation of a second set of network resources for the communication;

cause the communication to occur via the second set of network resources; and deallocate the second set of network resources after causing the communication to occur.

2. The device of claim 1, where the one or more processors are further to:

determine whether the other device is active; and where the one or more processors, when pre-allocating the first set of network resources, are to:

pre-allocate the first set of network resources based on determining that the other device is active.

3. The device of claim 1, where the one or more processors, when determining the expected quantity of network resources, are to:

determine an uplink portion of the expected quantity of network resources for uplink portions of the communication; and determine a downlink portion of the expected quantity of network resources for downlink portions of the communication.

4. The device of claim 1, where the one or more processors, when causing the communication to occur, are to:

receive an uplink portion of the communication via an uplink portion of the second set of network resources without receiving an uplink portion of another communication via the uplink portion of the second set of network resources, or provide a downlink portion of the communication via a downlink portion of the second set of network resources without providing a downlink portion of the other communication via the downlink portion of the second set of network resources.

5. The device of claim 1, where the historical information includes at least one of:

information indicating a particular day;

information indicating a particular time of day;

information indicating a particular type of device of the other device;

information indicating a particular type of customer equipment;

information indicating past quantities of communications between the device and the other device; or information indicating one or more types of communications between the device and the other device.

6. The device of claim 1, where the other device is a remote terminal device;

where the one or more processors are further to:

determine whether to pre-allocate the first set of network resources based on an attribute of the remote terminal device; and where the one or more processors, when pre-allocating the first set of network resources, are to:

pre-allocate the first set of network resources based on the attribute of the remote terminal device.

7. The device of claim 6, where the attribute of the remote terminal device includes information associated with a Quality of Service (QoS) level.

8. A non-transitory computer-readable medium storing instructions, the instructions comprising:

one or more instructions that, when executed by one or more processors of a first device, cause the one or more processors to:

determine historical information associated with previous communications between the first device and a second device;

determine an expected quantity of network resources for a communication between the first device and the second device based on the historical information;

pre-allocate, based on the historical information, a first set of network resources in accordance to the expected quantity of network resources for the communication prior to a third device initiating the communication;

receive an indication to allocate the network resources for the communication, the indication indicating a quantity of network resources different from a quantity of network resources in the pre-allocation of the first set of network resources;

adjust the pre-allocation of the first set of network resources to an allocation of a second set of network resources for the communication;

cause the communication to occur via the second set of network resources; and deallocate the second set of network resources after causing the communication to be occur.

9. The non-transitory computer-readable medium of claim 8, where the one or more instructions, that cause the one or more processors to adjust the pre-allocation of the first set of network resources to the allocation of the second set of network resources, cause the one or more processors to:

allocate an uplink portion of the second set of network resources for uplink data associated with the communication.

10. The non-transitory computer-readable medium of claim 8, where the one or more instructions, that cause the one or more processors to adjust the pre-allocation of the first set of network resources to the allocation of the second set of network resources, cause the one or more processors to:

allocate a downlink portion of the second set of network resources for downlink data associated with the communication.

11. The non-transitory computer-readable medium of claim 8, where the one or more instructions, when executed by the one or more processors, further cause the one or more processors to:

determine whether the second device is active or idle; and where the one or more instructions, that cause the one or more processors to pre-allocate the first set of network resources, cause the one or more processors to:

pre-allocate the first set of network resources based on determining that the second device is active, or prevent pre-allocation of the first set of network resources based on determining that the second device is idle.

12. The non-transitory computer-readable medium of claim 8, where the one or more instructions, that cause the one or more processors to determine the expected quantity of network resources, cause the one or more processors to:

determine uplink network resources for uplink portions of the communication; and determine downlink network resources for downlink portions of the communication.

13. The non-transitory computer-readable medium of claim 8, where the one or more instructions, when executed by the one or more processors, further cause the one or more processors to:

determine whether to pre-allocate the first set of network resources based on an attribute of the second device; and where the one or more instructions, that cause the one or more processors the pre-allocate the first set of network resources, cause the one or more processors to:
pre-allocate the first set of network resources based on the attribute of the second device.

14. The non-transitory computer-readable medium of claim 13, where the attribute of the second device includes location information of the second device.

15. A method, comprising:
determining, by a device, historical information associated with previous communications between the device and a first other device;
determining, by the device, an expected quantity of network resources for at least one communication between the device and the first other device based on the historical information;
determining, by the device, a first set of network resources for the at least one communication using the historical information;
pre-allocating, by the device, the first set of network resources in accordance to the expected quantity of network resources for the at least one communication prior to a second other device initiating the at least one communication;
receiving, by the device, a request for network resources for the at least one communication,
the request indicating a quantity of network resources different from a quantity of network resources in the pre-allocation of the first set of network resources; and
adjusting, by the device, the pre-allocation of the first set of network resources to an allocation of a second set of network resources that the at least one communication is to use based on the request.

16. The method of claim 15,
where the request is received from the first other device or the second other device.

17. The method of claim 15, further comprising:
determining whether to pre-allocate the network resources based on an attribute of the request; and
where pre-allocating the network resources comprises:
pre-allocating the network resources based on determining that the attribute of the request indicates pre-allocating the network resources.

18. The method of claim 15, where the device is a network hub device communicating wirelessly with the first other device.

19. The method of claim 15, where the first other device is a remote terminal device.

20. The method of claim 15, further comprising:
determining whether to pre-allocate the first set of network resources based on an attribute of the first other device; and
where pre-allocating the first set of network resources comprises:
pre-allocating the first set of network resources based on the attribute of the first other device.

* * * * *